(12) United States Patent
Didden et al.

(10) Patent No.: US 12,710,321 B2
(45) Date of Patent: Aug. 18, 2026

(54) ASSEMBLY OF INTEGRATED SOFT FORCE SENSOR

(71) Applicant: Melexis Technologies SA, Bevaix (CH)

(72) Inventors: Jeroen Didden, Tessenderlo (BE); Theo Le Signor, Bevaix (CH); Gael Close, Bevaix (CH); Nicolas Dupre, Bevaix (CH)

(73) Assignee: Melexis Technologies SA, Bevaix (CH)

( * ) Notice: Subject to any disclaimer, the term of this patent is extended or adjusted under 35 U.S.C. 154(b) by 420 days.

(21) Appl. No.: 18/466,974

(22) Filed: Sep. 14, 2023

(65) Prior Publication Data

US 2024/0094071 A1 Mar. 21, 2024

(30) Foreign Application Priority Data

Sep. 15, 2022 (EP) .................................... 22195874

(51) Int. Cl.
*G01L 1/12* (2006.01)

(52) U.S. Cl.
CPC .................................... *G01L 1/122* (2013.01)

(58) Field of Classification Search
None
See application file for complete search history.

(56) References Cited

U.S. PATENT DOCUMENTS 7,453,256 B2 * 11/2008 Berkcan ............... G01R 15/148 324/117 R
9,035,731 B2 * 5/2015 Brandl .................... G01L 1/044 335/207
11,287,340 B2 * 3/2022 Jiang ....................... G01L 1/122
12,339,159 B2 * 6/2025 Dupre ...................... G01G 7/02
2007/0209437 A1 9/2007 Xue et al.

FOREIGN PATENT DOCUMENTS

CN 111174957 A 5/2020

OTHER PUBLICATIONS

Extended European Search Report from corresponding EP application No. 22195874.7, Mar. 7, 2023.
Kawasetsu Takumi et al., "Flexible Tri-Axis Tactile Sensor Using Spiral Inductor and Magnetorheological Elastomer", IEEE Sensors Journal, IEEE, USA, vol. 18, No. 14, Jul. 15, 2018.

* cited by examiner

*Primary Examiner* — Peter J Macchiarolo
*Assistant Examiner* — Jermaine L Jenkins
(74) *Attorney, Agent, or Firm* — Workman Nydegger

(57) ABSTRACT

A method of manufacture of a force sensor and a force sensor is provided. The force sensor can be used to measure contact forces. The force sensor includes a substrate with an electromagnetic sensing element for contactless sensing of a field formed by a target. The target is included in a flexible piece which receives the force, and can deform by it. The flexible piece is treated so that the force sensor is reliable and has long durability.

13 Claims, 4 Drawing Sheets

ASSEMBLY OF INTEGRATED SOFT FORCE SENSOR

FIELD OF THE INVENTION

The invention relates to the field of force sensors. More specifically it relates to force sensor using position sensing and manufacturing thereof.

BACKGROUND OF THE INVENTION

Force sensors are used in many applications. Each type needs to meet certain requirements of compactness, range of sensitivity, and reliability among others.

For example, force sensors can be used as feedback, to assist automatized manipulation of objects. In automatic manipulation, the force applied on the object is usually difficult to control, which may cause faulty manipulation or wrong positioning of the manipulated piece, or even damage to the piece.

In the field of robotics, robot clamps or hands can include force-torque sensors, for example on the mechanical part that drives the motion of the grasping pieces (claws, fingers or the like). However, this measurement is indirect. Measuring the deformation of the contact surface with the piece to be handled is not straightforward. To solve this, the actual contact force may be measured. This can be done by using a flexible material, such as an elastomer, whose surface contacts the object to grasp, and the deformation of the surface is measured as an indication of the force applied on the object. The deformation can be measured with a position sensor on the substrate over which the flexible material is laid out, which detects the position of a target, such as a magnet or the like, which moves as the flexible material deforms.

The sensitivity of the force sensor is, hence, determined by the deformation resistance of the flexible material. If the flexible material has very low resistance to deformation, the sensitivity will be high, but the force sensor will be less responsive to high forces. In extreme cases, the electronics of the position sensor may be damaged due to, for example, impact forces or large contact forces. These requirements need also to be compatible with compactness requirements, so the force sensor can be integrated in larger systems.

An important requirement, mainly for object manipulation, is reliability when the contact zone is subject to shear forces. The flexible material should not break or separate from the substrate due to these forces. Preferably, the position sensor should be able to reliably measure these forces, also.

It would be desirable to provide a sensitive and compact force sensor with long lifetime, which is reliable even if submitted to shear forces.

SUMMARY OF THE INVENTION

It is an object of embodiments of the present invention to provide a compact and reliable sensor for sensing forces, especially contact and shear forces, in an accurate way for a wide range of forces. It is a further object to provide an assembly including such sensor, and a method of manufacture of the sensor.

In an aspect, the present invention provides a method of manufacture of a force sensor. The method comprises providing a flexible piece where one of its surfaces is an attachment surface, the piece further including (e.g. embedding) a target piece.

Then, a substrate is provided, comprising a receiving surface and including at least one sensing element. The sensing element(s) can sense changes of the (electro)magnetic field caused by the motion of the target piece.

The method comprises attaching the attachment surface of the flexible piece to the receiving surface of the substrate by providing surface activation on the attachment surface, then providing an adhesive layer in contact with at least the attachment surface, by sandwiching the adhesive layer between both the receiving surface and the attachment surface. It is an advantage of embodiments of the present invention that a reliable force sensor can be obtained with improved attachment between the flexible piece and the sensing portion of the sensor. It is an advantage that an elastomer such as rubber or silicone can be reliably attached to a molding compound such as epoxy for a long term use. It is an advantage that high shear forces can be measured, since improved attachment is provided.

In some embodiments, the substrate is a semiconductor package and the at least one sensing element is an integrated circuit included in the semiconductor package, forming a chip. Attaching the flexible piece to the substrate comprises attaching the attachment surface of the flexible piece to the receiving surface of the semiconductor package.

It is an advantage of embodiments of the present invention that a highly compact device can be obtained, with very small footprint.

In some embodiments, providing surface activation comprises providing plasma treatment. It is an advantage of embodiments of the present invention that ionic treatments such as plasma treatment or the like can be used to locally treat the surface of the flexible piece, thus allowing a very controlled surface activation. This advantageously improves the hydrophilicity of the surface, improving bond between the material of the flexible piece and the material of the adhesive layer, thus enhancing adhesion.

In some embodiments, providing the flexible piece comprises forming the flexible piece as a single piece by injection molding.

It is an advantage of embodiments of the present invention that the piece can be provided as a single unit, without junctions, hence with homogeneous properties and lower risk of breaking apart. It is a further advantage that the method is compatible with high volume manufacturing platforms in injection molding and micro-electronic assembly.

In some embodiments, providing the flexible piece comprises providing the target piece and encapsulating it within the flexible piece.

It is an advantage of embodiments of the present invention that no adhesive is required to attach the target piece to the flexible piece, thus reducing the chances of adhesive failure.

In some embodiments, providing a substrate comprising a sensing element comprises providing a sensing element adapted to sense magnetic field in at least two different directions.

It is an advantage of embodiments of the present invention that a multidirectional force sensor can be provided, which allows sensing the force in 2 directions, for example in 2 perpendicular directions, for example the force in 3D, rather than only one component. Such sensor can be used as a grasp sensor, for instance, which allows grasping firmly to lift an object with less grasping force than required to damage or deform the object.

In some embodiments, the method comprises providing a cavity to the flexible piece. The cavity is at least partially enclosed by the flexible piece, and it is adapted to improve mobility of the target piece.

It is an advantage of embodiments of the present invention that high sensitivities can be obtained. It is a further advantage that the stable lifetime of the sensor can be increased.

In particular embodiments it is advantageous to provide a vent for fluidly connecting the cavity of the flexible piece with the exterior of the force sensor.

It is an advantage of embodiments of the present invention that the mobility of the target piece is not hindered by pressure difference, thus improving mobility and reducing response times.

Providing the cavity may comprise providing an open cavity wherein the attachment surface includes an opening to the attachment surface. The flexible piece may have a bell shape. It is an advantage of embodiments of the present invention that a force sensor with high sensitivity can be provided while at the same time providing protection to the chip by reducing the pressure on its surface.

In an aspect, the present invention provides a force sensor including a flexible piece which holds a target piece. The flexible piece has an attachment surface distal from the target piece. The force sensor also comprises a semiconductor package including at least one sensing element, for sensing the magnetic field generated by the target piece. The package also includes a receiving surface. The flexible piece is attached to the semiconductor package on the attachment surface, which is contained in and attached to the receiving surface. The flexible piece comprises a cavity positioned between the target piece and the semiconductor package. It is an advantage of embodiments of the present invention that the force sensor is highly sensitive and flexible without sacrificing protection to the electronics.

In an aspect, the present invention provides a force sensor including a flexible piece holding a target piece. The flexible piece has an attachment surface distal from the target piece. The force sensor further includes a substrate comprising a sensing element for sensing the magnetic field generated by the target piece and a receiving surface. The flexible piece is attached to the substrate by an adhesive layer in contact with the attachment surface, and having chemical bonds therewith which are provided by activation of the attachment surface. This improves adherence of the flexible piece with the adhesive layer.

It is an advantage of embodiments of the present invention that the force sensor is reliable and sensitive even for high contact forces and for shear forces.

In some embodiments, the flexible piece with activated surface further comprises a cavity positioned between the target piece and the semiconductor package of the force sensor.

It is an advantage of embodiments of the present invention that a highly sensitive force sensor can be obtained even for high contact forces and for shear forces.

In the embodiments comprising a cavity, the flexible piece may further comprise a vent for providing fluidic contact to the cavity with the exterior of the force sensor.

It is an advantage of embodiments of the present invention that the mobility of the target piece is not hindered by pressure difference, thus improving mobility and reducing response times.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
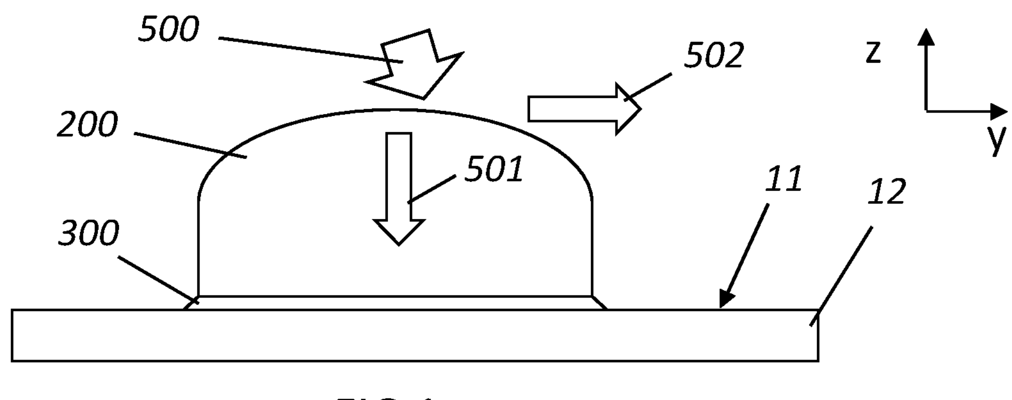
FIG. 1 illustrates the side view of a force sensor in accordance with embodiments of the present invention and an exemplary contact force at which it may be submitted.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "target piece" or "target" for short, reference is made to a shaped piece of material whose position variation is sensed by a sensing element.

Where in embodiments of the present invention reference is made to "flexible piece", reference is made to a shaped piece of material with flexible properties, for example it may be compressible, and it preferably has elastic properties so it returns to the original shape in the absence of forces. Appling a force on the flexible piece provides a displacement of the material matrix forming the piece, in particular in compression. In some embodiments, the term "elastomer" will be used, but the present invention is not limited to pieces made by elastomeric polymers.

A category of force sensors includes those with one or more sensing elements which detect position displacement of a target piece upon applying the force on the sensor. The present invention relates to force sensors including one or more contactless sensing element, wherein the sensing element or elements are configured to detect position of the target piece, and/or displacements thereof, without making physical contact with the piece. More in particular, the force sensor of the present invention is configured to detect mechanical forces, in particular contact forces applied on the flexible piece which integrates the target.

Sensing may be based on an electromagnetic sensing. For example, it may be based on the detection of magnetic or electromagnetic field as a function of the position of a target. In some embodiments, sensing is based on the change of a magnetic (or electromagnetic) field, due to the target motion. The target may generate a magnetic field, for example it may be a magnet or it may be a conductor in which a magnetic field can be induced. The sensing element may sense the position or changes thereof depending on the nature of the field. The sensing element produces signals which are processed to obtain a readable output representative of the force applied. The target and the sensing element may be appropriately chosen and combined to generate or induce an electromagnetic field whose changes are caused by motion of the target and whose detection by the sensing element can be correlated with the amount of displacement of the target. For example a magnetic sensing element (e.g. a Hall sensor) may be combined with a magnet as a target. The chip may be configured to generate a signal representative of the force causing displacement of the target. For example, the chip may include processing means (e.g. an integrated circuit on a semiconductor substrate) configured to apply a non-linear model, allowing to directly derive the force. Alternatively, it may calculate the position of the target to obtain the force which caused displacement of the target.

Motion of the target due to contact is provided by an elastic or flexible piece which supports the target. Upon contact, the flexible piece deforms in accordance with the contact force. The target, being part of the flexible piece, also moves.

Since the relative position of the sensing element and the target is important, it is required a reliable attachment between the parts forming the sensor, in particular the part containing the sensing element and the target included in the flexible piece.

The present invention provides an improved force sensor with improved attachment between the flexible piece including the target and the substrate comprising the sensing element, so the force sensor present high resilience to a wide range of applied contact forces, either compression or shear forces. In some embodiments, the flexible piece is directly attached to the semiconductor package which contains the sensing element(s) with improved attachment. In these embodiments, the flexible piece is shaped so it fits the small area of a semiconductor package (a chip). By integrating the elastomer and target directly onto the package and keeping it also within the package outline borders, it provides a significant advantage towards compactness and integration with a claw or robot hand or the like. However, the present invention is not limited thereto, and the attachment may be done on a substrate including a chip, e.g. including connections to the chip. The substrate may be a printed circuit board (PCB).

In some embodiments, the manufacture of the flexible piece includes activation of the attachment surface, which improves adhesion of the flexible piece to the chip. The flexible piece also may comprise features which improve force sensitivity, by improving the deformation and elastic response of the flexible piece to an applied force.

Figure 2:
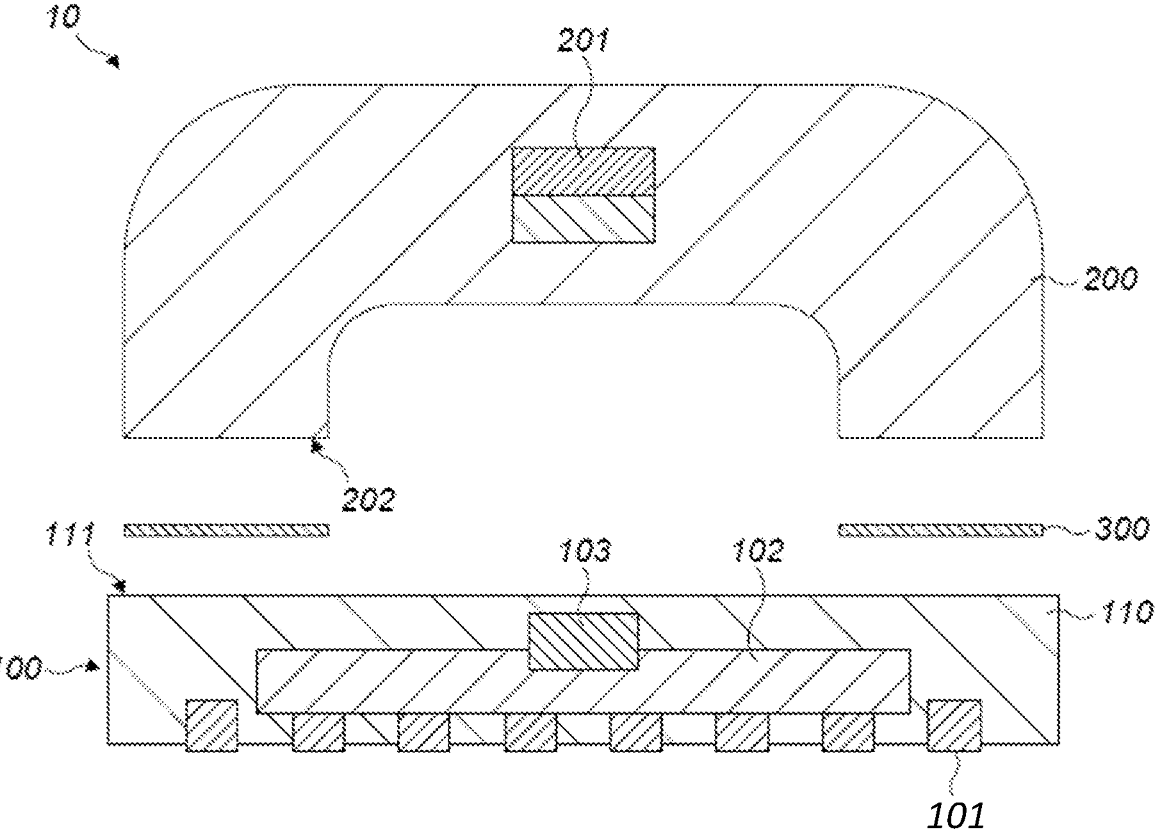
FIG. 2 illustrates an exploded cross section of a force sensor in accordance with embodiments of the present invention.

Aspects of the force sensor and its manufacture are shown in FIG. 1 and FIG. 2. FIG. 1 shows a lateral view of a force sensor in accordance with embodiments of the present invention. The force sensor includes a flexible piece 200 and a substrate 12 including at least one sensing element. The substrate includes a sensing element that can sense a force 500 applied on the flexible piece. The sensing element may sense the vertical force (compression component 501 towards the sensing element) and may additionally sense any shear component 502 of the force, perpendicular to the compression component. The flexible piece 200 and the substrate 12 are linked by an adhesive layer 300. The adhesive layer extends through one side of the flexible piece 200. This side is known as the 'attachment surface'. The adhesive layer covers a so-called receiving surface 11 of the substrate 12. The force sensor in embodiments of the present invention includes a flexible piece which with features which increase the reliability over time. As explained further below, in some embodiments, the flexible piece includes a cavity that reduces displacement perpendicular to the compression direction over the displacement of the flexible piece in the compression direction, thus reducing strain of the flexible material and improving reliability over time. In some embodiments, the attachment surface of the flexible piece 200 is activated. Activation improves chemical bonding with the adhesive layer 300. The substrate includes one or more sensing elements and electronics that can process the signals of the sensing element(s), and the sensing elements and the target of the flexible piece (not pictured) are aligned, so the sensing element(s) can sense the field from the target. For example, the substrate 12 may be a PCB including connections to a sensor integrated in a chip, for sensing electromagnetic field and/or changes thereof caused by the target and/or its motion. The substrate may be chosen to have a high affinity with the material of the adhesive layer. In some embodiments, the substrate comprises glass fiber-epoxy resin.

FIG. 2 presents a lateral section of a force sensor 10 in accordance with some embodiments, in exploded view. The semiconductor package, or chip 100 for short, is situated at the bottom. It includes an integrated circuit implemented in a semiconductor die 102, for example. The semiconductor die 102 may be protected from the exterior by packaging material 110, such as overmolding material, e.g. epoxy resin or the like. The chip 100 further integrates a sensing element 103. Signals generated by the sensing element and processed by the circuit can be sent to a readout through pins 101, as is well known. The pins 101 may be connected to a substrate, not shown.

As mentioned earlier, the force sensor 10 further includes a flexible piece 200 wherein a target piece 201 is provided. The target piece 201 may be a magnet. The sensing element 103 is sensitive to the (electro)magnetic field from the target piece 201, for example to the magnetic field generated by the target. Translation of the target can be measured by the sensing element, for example a motion towards the sensing element due to a compression force applied on the flexible piece. The sensing element 103 may be a magnetic field sensor such as a Hall sensor.

Where in embodiments of the present invention reference is made to compression force, reference is made to a force applied in the Z direction between the target and the sensing element. Where in embodiments of the present invention reference is made to shear force, reference is made to a force applied perpendicular to the direction of the compression force (thus, force at least the X and/or Y directions which are perpendicular to the normal of the contact surface, e.g. perpendicular to the Z direction of the compression force). In the following, the plane containing the directions perpendicular to the compression force will be called 'X-Y plane'. A force applied on the sensor may have compression and shear components.

In some embodiments, the sensor can eventually also measure torsion, not only translation of the magnet in the straight perpendicular directions in space but also rotation of the magnet (for example defined by two angles). This can be implemented, for example, with a 3D sensor, for example a 3D Hall sensor made of a combination of horizontal Hall elements (sensitive to motions with direction perpendicular to the IC) and vertical Hall elements (sensitive to motions with direction parallel to the IC). In some embodiments, the implementation can provide a 3D sensor made of horizontal Hall elements and magnetic concentrators disposed so as to concentrate components of the magnetic field in different directions separately. In some embodiments, magneto-resistive elements, such as AMR, or GMR, or TMR can be used.

In those embodiments wherein the flexible piece is attached to the chip 100, the flexible piece should be fabricated such that its footprint fits the area of a chip 100.

The flexible piece 200 may include a cavity 206 thereby distancing the target piece 201 from the sensing elements. The flexible piece includes an attachment surface 202. The surface in the present embodiment is shaped as an annulus if the flexible piece has a cavity open at the attachment surface, of which only the cross section is shown in FIG. 2. The flexible piece may have any other suitable shape, so the attachment surface 202 may be a square annulus delimited by a square nested within another square (e.g. two concentric squares) or the like; for example the inner and outer boundary may have different shapes such a circle and a square or viceversa, depending on available room, etc. The flexible piece 200 is attached to the chip 100 by a layer of adhesive 300 on an appropriate receiving surface 111 of the chip 100, e.g. a surface close to the sensing element(s) 103. The packaging material 110 may be part of the external surface of the packaging material 110, e.g. an external surface of the chip casing.

The adhesive layer of the force sensor holds together the flexible piece and the chip. This type of force sensors can be attached on those areas where a force measurement is required. In the field of robotics or the like, an accurate force measurement can benefit control of the applied force, for example grasping force of a robotic claw. Robots grasp objects supported by computer-aided vision feedback. To achieve human-like dexterity, robotic hands or claws need to incorporate tactile sensors. These sensors need to be small and able to detect forces within a range sensitive enough for the required application. The present invention provides a force sensor for sensing contact of a robotic hand or claw with an object to be handled. The force sensor as described above can be used to measure not only the compression force, but also shear forces.

A usual problem in force sensors is the lowering of reliability when submitted to strong forces. Specially, shear forces are a major cause of reliability issues linked to loosening of the pieces, or even detachment of the flexible piece from the receiving area. In the case of the present invention where the receiving area is at least as small as the footprint of a chip, the problem is considerably greater, as the smaller attachment area means smaller amount of adhesive, so the chance of detachment as the force increases, in particular shear forces, also increases highly. Moreover, since the flexible piece should be small in order to fit the chip, the measurements are also less sensitive, because the displacement allowed by the amount of elastic material is lower.

In an aspect, the present invention relates to a method of manufacture of a force sensor. The method is roughly outlined in the schematic of FIG. 3. The method includes providing S10 a flexible piece comprising a target piece, providing S20 a substrate with the sensing element and a receiving substrate, and attaching S30 the flexible piece to a receiving surface of the substrate. In some embodiments, the substrate is a semiconductor package, or chip, integrating one or more sensing elements and circuitry for processing the sensing signal.

The manufacturing method includes providing S10 the flexible piece so as to increase reliability even under high forces. In some embodiments, the flexible piece is provided S10 with a shape and size such that the attachment surface 202 fits the surface area on the chip (in particular, the largest external surface area of the chip).

In particular, the flexible piece can be advantageously provided as a single piece, for example embedding the target. It may comprise providing an elastomer, such as silicone, rubber, etc. In particular, the piece can be provided S11 by injection molding. This way, the piece does not include junctions between the flexible material, being homogeneous, and hence with less 'weak' points prone to tear. This is not the only possibility, and the flexible piece can be manufactured by assembling a plurality of parts. In some embodiments, the flexible piece may be provided by additive manufacturing, e.g. 3D printing.

In some embodiments, the flexible and target pieces be provided separately, and the target piece is introduced into the flexible piece. For example, the flexible piece may be formed including openings so as to introduce the target. In preferred embodiments, the flexible piece is formed S11 around the target, for example by injection molding, with the injected material directly in contact with the target piece, e.g. the magnet is overmolded with the material of the flexible piece.

The distance between the target and the sensing element in rest position (with no force applied) must be carefully controlled, for calibration. The strength of the coupling between the target and the sensing elements, the need for reasonable compact device and the force levels that would be applied need to be taken into account, as well as reasonable protection of the electronics. In some embodiments of the present invention, providing the flexible piece includes forming S12 a cavity for distancing the target from the attachment surface (and from the sensing element, once assembled).

Figures 3, 4:
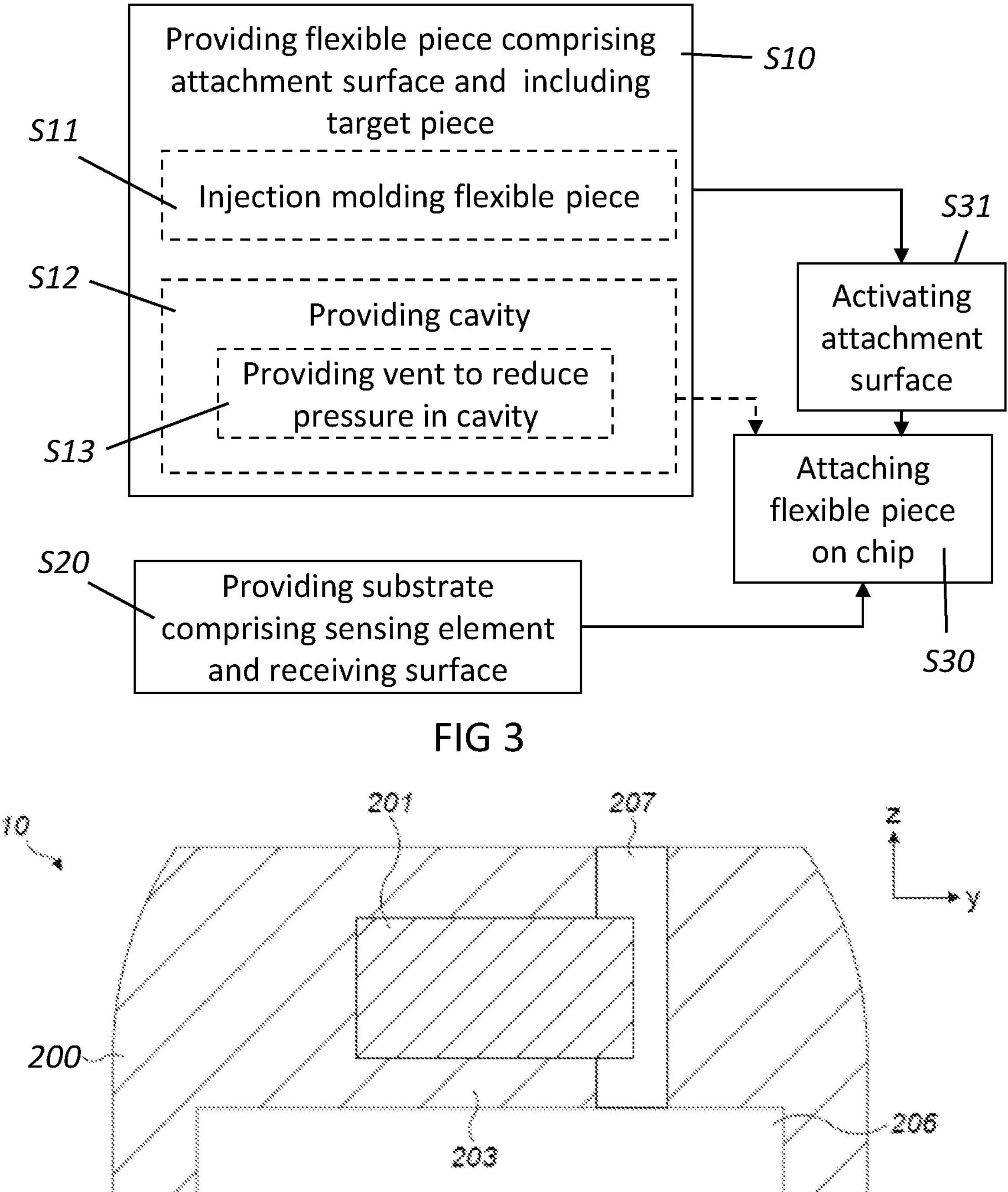
FIG. 3 illustrates schematically steps of a manufacturing method in accordance with embodiments of the present invention.
FIG. 4 illustrates a side view of a force sensor in accordance with embodiments of the present invention.

FIG. 4 shows a side view of a force sensor 10. Here, the flexible piece 200 is a transparent truncated dome with flat surface for receiving the force, and it reveals the target piece 201 as well as the cavity 206 which improves deformation of the flexible piece. By forming S12 the cavity, the flexible piece offers high deformation for small contact forces (allowing reducing target size since the sensitivity is less constrained by the field strength, while still providing protection of the underlying electronics, for example against impact forces. This improves protection to electronics without sacrificing sensitivity.

In embodiments of the method including forming S12 a cavity, the method may include further forming S13 a vent 207 for fluidly connecting the cavity 206 of the flexible piece 200 with the exterior of the force sensor 10. It may be formed wide enough so it allows the required venting of the deforming cavity 206 while applying the force. This reduces pressure in the cavity while applying a deforming force on the flexible piece. It is an advantage of embodiments of the present invention that the mobility of the target is not hindered by pressure difference, thus improving mobility and reducing response times. The manufacture of the flexible piece with vent by injection molding can be done by introducing a molding part with the desired shape In particular advantageous embodiments, the molding part that shapes the vent 207 is used to simultaneously hold the target piece 201 during e.g. molding. In FIG. 4 the vent 207 has a 'chimney' shape, fluidly connecting the cavity with the exterior via the top of the flexible piece, in a region opposite to the attachment surface. The vent may be formed with two elongated pieces shaped so that they can hold the target, so the target does not need to rest e.g. on top of the mold piece that shapes the cavity. This allows filling with elastomer also the space between the target and the cavity. Once the flexible piece is formed, the elongated pieces can be removed from the top and the bottom, giving shape to the vent and releasing the target inside the flexible material.

In some embodiments, providing the flexible piece comprises manufacturing structures for holding the target. This structure or structures may include beams extending between the inner walls of the cavity. An exemplary holding structure 203, 213 is shown in the perspective view of the different flexible pieces 200, 210 shown in FIG. 5. In the case of injection molding, parts of the mold may support the target before injecting the molding compound which forms the flexible piece. The spaces between these parts shape the holding structures 203, 213. Other structures such as strengthening protrusions 204 may be included during manufacturing, as shown in the flexible piece 210 of FIG. 5, on the right side.

Figure 5:
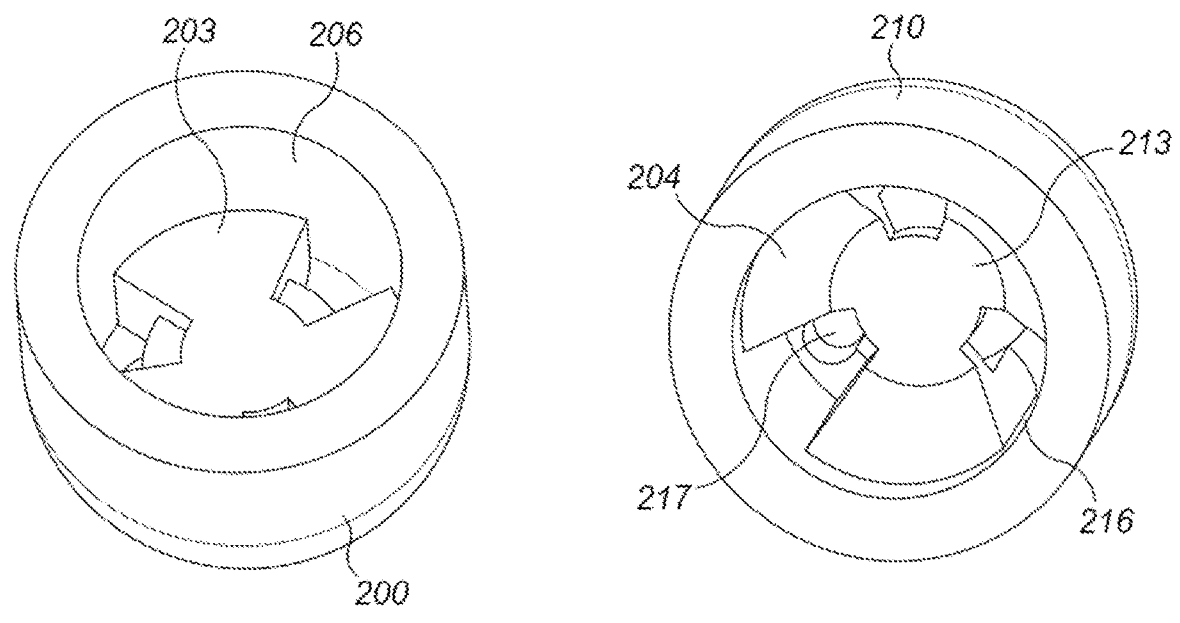
FIG. 5 illustrates a perspective view of the cavity of two flexible pieces for use in a force sensor in accordance with embodiments of the present invention.

In some embodiments, an open cavity is formed on the flexible piece, with the opening arranged to face the sensing element, for example an opening in the attachment surface. The flexible piece has a hollowed shape, for example similar to a bell or cowbell. FIG. 4 or FIG. 5 show such an open cavity 206, 206 in a bell-shaped flexible piece 200, 210. In spite of the heavily reduced attachment surface 202, the disadvantage is also overcome by the advantage of being able to form the piece easily, e.g. by injection molding, which is fast and reliable and provides high quality pieces, as explained earlier.

However the present invention is not limited thereto. The cavity may be formed with a wall enclosing the cavity on the inner side and an attachment surface on the external side. In other words, there is no opening to the cavity through the attachment surface. This way, the area of the attachment surface may be increased. Such cavity with no opening at the attachment surface may be formed by assembling separate parts, or by additive manufacturing as explained earlier, or otherwise.

The method further comprises attaching S30 the flexible piece on the substrate. semiconductor package or chip. In some embodiments, this comprises providing adhesive and using it to attach the flexible piece to the external surface of the package of the chip 100, for example on the packaging material 110, e.g. on the epoxy casing protecting the sensing element and/or the integrated circuitry. The flexible piece is positioned so that the part of the flexible piece containing target is distal from the sensing element of the chip. In embodiments of the present invention wherein the flexible piece includes a cavity, the flexible piece is attached to the chip so that the cavity remains between the chip and the target.

The adhesive may be any suitable adhesive for the chip package. For example, the adhesive may comprise silicone, epoxy resin, etc. FIG. 4 shows the adhesive layer 300 sandwiched by the flexible piece 200 and the semiconductor package 100 (e.g. the chip). The adhesive layer 300 may for example be applied on the attachment surface 202 of the flexible piece and then the flexible piece with the adhesive layer may be fixed to the semiconductor package, on the receiving surface thereof. In other embodiments, the adhesive is applied on the receiving surface 111 of the chip 100, and the flexible piece is put in contact with the adhesive. For example, a layer of glue is placed on the receiving surface of the chip 100, and the flexible piece is placed on the glue. This may be preferable to minimize the amount of adhesive inside the cavity and, in particular, extending along the cavity wall(s), if the flexible piece comprises a cavity opening on the attachment surface.

The presence of a cavity improves the lifetime of the flexible piece, as it will be explained below, due to the reduction of deformation in the directions perpendicular to the compression direction, so it is possible to simple attach the piece to the substrate. In preferred embodiments, before attaching S30 the flexible piece on the substrate, the method comprises activating S31 the attachment surface 202 of the flexible piece 200 before contacting the adhesive of the adhesive layer 300. The activation can be done by applying a treatment which increases hydrophilicity of the surface, so adhesion improves. In some embodiments, the activation is done by exposing the surface to high energy ionic charge. In some embodiments, the activation is done by applying plasma treatment. With activation it is meant that surface becomes more hydrophilic, for example by formation of carboxyl groups and/or breaking surface bonds, in case of elastomers. It is noted that the plasma treatment (the parameters, energy, etc.) is adapted for activation of the surface, not merely surface cleaning. The plasma can be generated using plasma torch, for example in open air. Alternatively, the plasma can be generated under a controlled atmosphere, e.g. in a processing chamber, in a controlled atmosphere, for example at atmospheric pressure, or at a lower pressure, e.g. between 0.1 and 10 mBar.

Multiple pieces can be processed at the same time. For example, a processing chamber (such as a closed chamber with a controlled atmosphere) can be used to process a plurality of flexible pieces. In some embodiments, a pick and place machine can be configured for picking the flexible piece and contacting it with plasma (e.g. generated by a plasma torch), and then assembling the device by placing the flexible piece where required.

The plasma can be generated using ambient air as input gas (even in the chamber), or using any suitable gas (e.g. Ar, $O_2$, $N_2$). The plasma can be a DC, or AC, or RF plasma. The generator may have a power between 100 W and several kW, e.g. 300 W or 500 W, and a frequency between 10 kHz or 200 kHz, e.g. 20 kHz or 100 kHz. The duration of plasma activation can tens of seconds, e.g. 50*s*, but it can very likely be much less as well, e.g. a few seconds. As long as surface activation is reached, any suitable process condition can be used.

The present invention is not limited to plasma treatment, and other methods of surface activation can be performed, such as other physical and/or chemical methods that are able to treat a surface to make it more hydrophilic.

In some embodiments of the present invention, the attachment surface 202 of the flexible piece, once activated, is put into contact with the adhesive before hydrophobic recovery takes place, so the surface 202 is still hydrophilic when contacting the adhesive layer 300. For example, the contact with the adhesive may be done immediately after treating the surface, for example it may be done within an hour, for example during in-line assembly.

Figure 6:
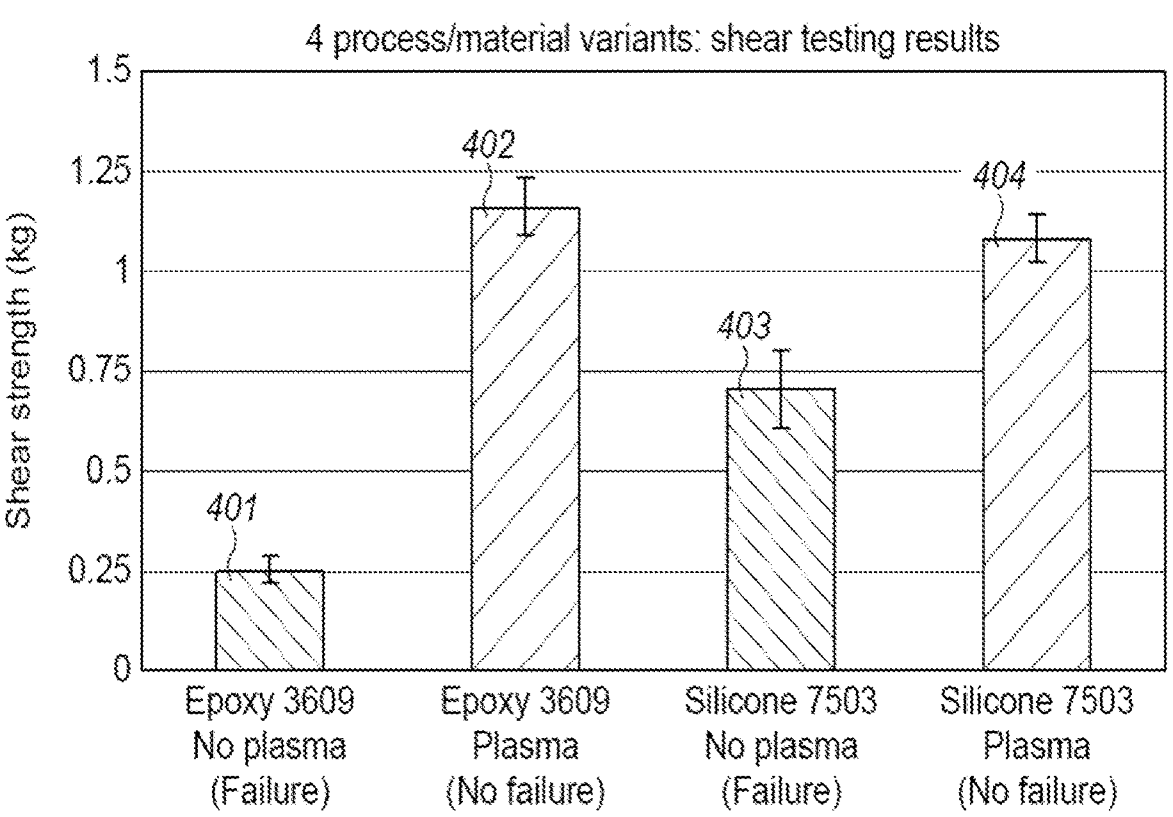
FIG. 6 illustrates the results of shear testing with shear forces equivalent to up to 1 Kg for flexible pieces attached with epoxy, with and without surface plasma treatment, and for flexible pieces attached with silicone, with and without surface plasma treatment.

FIG. 6 shows a graph with the results of shear tests of four variants with different process and materials, where the shear tests are performed on a flexible piece attached to a chip, such as for instance in the force sensor 10 shown in FIG. 4. The first graph 401 shows the results for a flexible piece attached to the chip with epoxy 3609, where no plasma treatment was carried out on the flexible piece. The shear strength (in kg) reaches around 0.25, with adhesive failure. The third graph 403 shows the results for a flexible piece attached to the chip with silicone 7503, where no plasma treatment was carried out on the flexible piece. The shear strength is below 0.75, with adhesive failure. The second and fourth graphs 402, 404 show the results for epoxy 3609 and silicone 7503 respectively with no adhesive failure, surpassing 1 kg of shear strength. In these cases, plasma treatment was applied to the attachment surface before putting in contact the surface with the adhesive.

The manufacturing process may be done in a simple way, in a frame of passive alignment. For example, the manufacturing process may be automatized with simple tools such as a ‘pick-and-place’ machine. It may have computer vision or not. The machine may pick up and align in the flexible piece in the X-Y plane. The alignment enables planar placement in the X-Y plane with an accuracy of approximately 100 microns. Passive alignment does not require placement of the flexible piece with simultaneous reading of the sensing element to optimize positioning. It has been surprisingly found that the present invention provides sensors for which passive alignment is sufficient, rather than requiring active alignment.

Afterwards, the pins 101 of the chip can be connected to a board such as a PCB or the like, for powering the force sensor and providing signal output. The forces are applied directly on the flexible piece. Alternatively, the chip may be connected to a substrate or board, and the flexible piece may afterwards be adhered thereto after activation of the attachment surface.

In an aspect, the present invention provides a force sensor with improved sensitivity and reliability. The force sensor comprises a flexible piece attached to a receiving surface of a substrate, for example a chip wherein the attachment surface of the flexible piece does not extend beyond the chip. The flexible piece includes a cavity so it shows high flexibility, being highly sensitive to applied forces. In some embodiments it may by highly sensitive to a wide range of values of applied forces. The sensor is less prone to breaking due to application of shear forces.

FIG. 4 shows a cross section of a force sensor in accordance with embodiments of the present invention. It includes a flexible piece 200 attached to a chip 100 by an adhesive layer 300 between one of the surfaces of the flexible piece 200 (the so-called attachment surface 202) and a receiving surface 111 of the chip 100. The flexible piece 200 includes the target piece 201. The flexible piece may be cylindrical or conical, or it may have a domed shape. These are just examples, and other designs may be tailored to specific applications.

The cavity 206 between the chip 100 and the target piece 201 provides a tailored spacing between the target piece 201 and the sensing element 103. In some embodiments the cavity 206 may be opened at the attachment surface 202, so the cavity opens to the receiving surface 111 of the chip 100. Although the presence of the cavity opening at the attachment surface 202 does reduce the attachment area, it is easy to produce (e.g. by injection molding) while still providing high range of deformation (both for compression and shear forces), thus improving sensitivity over compact elastomer pieces.

A force sensor in accordance with embodiments of the present invention shows less degradation over time. Surprisingly, the flexible piece shows a very limited deformation in the horizontal direction (direction perpendicular to the direction of compression), due to the presence of the cavity. The elongation in the horizontal direction is smaller than in the vertical direction causing less strain in the material, hence less damage. The repeatability improves over time, hence the durability of the force sensor improves.

In some embodiments the flexible piece comprises support beams or in general holding structures 203 which prevent the target piece 201 from falling within the cavity 206. The flexible piece 200 at the left of FIG. 5 shows that the holding structures 203 may extend horizontally from the inner walls of the cavity 206. In some embodiments, a combination of the strengthening structures 204 and the holding structure 213 can be provided as shown in the flexible piece 210 at the right of FIG. 5. The strengthening structures may be ribs along the vertical direction. For example, in the inner walls of the cavity 216 the structures 204 include chamfering that extends vertically along walls and also horizontally, thus increasing resistance to compression, if required.

The flexible piece may further comprise at least one vent 207, 217 (shown in FIG. 4 and also in the flexible piece 210 at the right on FIG. 5). It ensures release of pressure from the cavity when applying forces. Deformation (due to compression or shear) would be more difficult if air remains inside the cavity while applying a force on the flexible piece. The vent 207 advantageously improves sensitivity and response time (speed of detection) of even 3D forces (compression and shear forces). It also protects the flexible piece from damages or detachment if the force applied is very high. The vent 207 may run from the inner wall of the cavity to the side or the external wall of the flexible piece, distal from the chip, as shown in FIG. 4.

Figure 7:
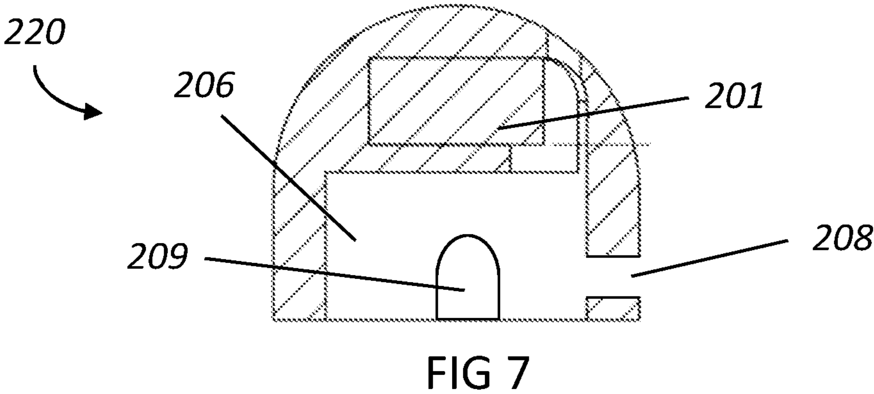
FIG. 7 illustrates a cross section of a flexible piece including a cavity. Different positions for a vent are shown in the piece.

FIG. 7 shows the cross section of an alternative embodiment of a flexible piece 220, wherein the vent 208 is close to the attachment surface, e.g. closer to the attachment surface than to the surface of the flexible piece for receiving the force, for example in the lower half of the flexible piece, considering half as the half of the height. The figure also shows an alternative in the same drawing, wherein the vent is a groove 209 through the attachment surface between the external wall of the flexible piece and the cavity. In this case, the groove should remain free of adhesive upon contacting the attachment surface with the adhesive layer, so the vent is not obstructed. Although both vents 208, 209 are shown in the same figure, a flexible piece may have a limited number of vents, e.g. only one, to keep structural integrity.

In an aspect, the present invention provides a force sensor including a flexible piece attached to a substrate with an adhesive layer. The attachment surface of the flexible piece is treated and activated to improve the attachment with the adhesive layer. The force sensor may be formed by the method of the method of the present invention. As such, the force sensor may include e.g. a cavity, a vent, etc.; the substrate may be a PCB with a chip including sensing elements and processing electronics included therein; however the substrate may be the package of the chip. The attachment surface 202 of the flexible piece 200 (again in FIG. 4) may show an increase of carbonyl functional groups and a reduction of organic bonds compared to the rest of the flexible piece. The open organic bonds of the material in the flexible piece react with the adhesive material, forming a chemical bond between the flexible material of the attachment surface 202 and the adhesive layer 300, thus improving adhesion.

Figure 8:
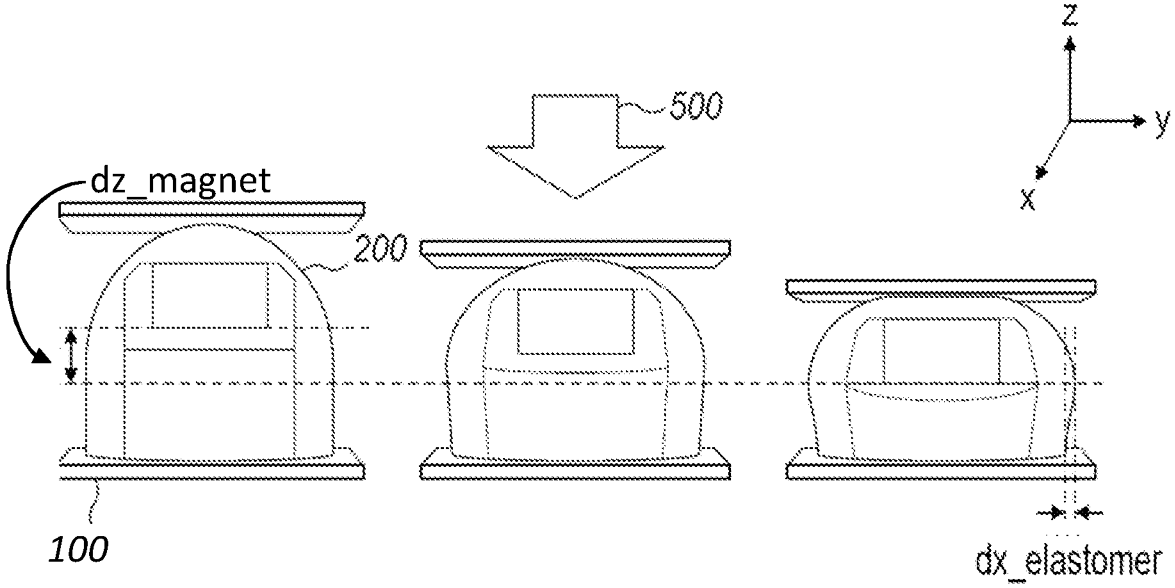
FIG. 8 illustrates three phases of a force sensor, in rest position on the left, and being submitted to an increasing compression force on the central and right images.

FIG. 8 shows a force sensor being used. The force sensor is configured to receive the (compression) force 500 to be measured on the region of the flexible piece 200 distal from the chip 100, for example on the cusp of a dome-shaped flexible piece 200. The flexible piece deforms and the target inside changes position, as shown in the schematic representations from the left wherein no force is applied, to the center and right representations wherein a force 500 is applied. The sensing element detects this change of position and generates a signal which is processed into a signal representative of the force applied. The force sensor may also be adapted to measure force in different directions, for example it may measure shear forces or components of the force in the shearing direction. The figure also shows the limited deformation in the horizontal direction thanks to the cavity, being smaller than in the vertical direction, and straining the material much less, as mentioned earlier. The elastomer deformation in the horizontal direction dx_elastomer can be measured and compared to the displacement dz_magnet of the magnet in the vertical direction (the direction of compression). The ratio of the deformation (dx_elastomer) to the displacement (dz_magnet) may be between 10% and 50%, for example between 20% and 40%, for example between 25% and 30%.

The sensing and processing are done by a sensing element and its connected integrated circuit, respectively. Both can be provided in the chip. The force sensor is compact in some embodiments wherein the attachment surface of the flexible piece is confined within the area of a surface of the chip, in particular on the external surface of the chip mold or casing. The force sensor may be connected to a PCB or a substrate on the grasping parts of a robot hand, thus allowing an accurate measurement of forces in compression and shear forces. The shear component of the forces may be generated while lifting an object grabbed by a robot hand, e.g. under the effect of the gravity. Durability of the force sensor improves by the presence of an improved adhesion, the presence of a cavity in the flexible piece, or both. Detachment of the flexible piece is reduced or even prevented, in some embodiments, by improved adhesion of the flexible piece thanks to the activation of its attachment surface.

The invention claimed is:

1. A method of manufacture of a force sensor comprising:

providing a flexible piece comprising an attachment surface, and further including a target piece, providing a substrate comprising a receiving surface for attaching the flexible piece, the substrate further including a sensing element configured to sense changes of the magnetic field from motion of the target piece, attaching the attachment surface of the flexible piece to the receiving surface by providing surface activation on the attachment surface of the flexible piece, and providing an adhesive layer in contact with at least the attachment surface by sandwiching the adhesive layer between both the receiving surface and the attachment surface.

2. The method of claim 1, wherein providing the substrate comprises providing a semiconductor package wherein the sensing element is an integrated circuit included in the semiconductor package thereby forming a chip, and wherein attaching the attachment surface comprises attaching the attachment surface of the flexible piece to the receiving surface of the semiconductor package.

3. The method of claim 1, wherein providing surface activation comprises providing plasma treatment.

4. The method of claim 1, wherein providing the flexible piece comprises forming the flexible piece as a single piece by injection molding.

5. The method of claim 1, wherein providing the flexible piece comprises providing the target piece and encapsulating it within the flexible piece.

6. The method of claim 1, wherein providing the substrate comprising the sensing element comprises providing the sensing element adapted to sense magnetic field in at least two different directions.

7. The method of claim 1, wherein providing the flexible piece comprises providing a cavity at least partially enclosed by the flexible piece, adapted to improve mobility of the target piece.

8. The method of claim 7, further comprising providing a vent for fluidly connecting the cavity of the flexible piece with the exterior of the force sensor.

9. The method of claim 7, wherein providing the flexible piece comprises providing an open cavity wherein the attachment surface includes an opening to the attachment surface.

10. A force sensor including a flexible piece holding a target piece, the flexible piece having an attachment surface distal from the target piece, and a semiconductor package including a sensing element, for sensing the magnetic field generated by the target piece, and a receiving surface, the flexible piece being directly attached to the semiconductor package, wherein the attachment surface is contained in and attached to the receiving surface, wherein the flexible piece comprises a cavity positioned between the target piece and the semiconductor package.

11. The force sensor of claim 10, wherein the flexible piece further comprises a vent for providing fluidic contact to the cavity with the exterior of the force sensor.

12. A force sensor including a flexible piece holding a target piece, the flexible piece having an attachment surface distal from the target piece, the force sensor further including a substrate comprising a sensing element for sensing the magnetic field generated by the target piece and a receiving surface, the flexible piece being attached to the substrate by an adhesive layer in contact with the attachment surface and having chemical bonds therewith by activation of the attachment surface, so as to improve adherence of the flexible piece with the adhesive layer.

13. The force sensor of claim 12, further comprising a cavity positioned between the target piece and the substrate.

* * * * *